United States Patent [19]

Takeuchi et al.

[11] Patent Number: 5,036,687
[45] Date of Patent: Aug. 6, 1991

[54] AUTOMOTIVE STEERING LOCK SYSTEM WITH PORTABLE RADIO CODE SIGNAL TRANSMITTER

[75] Inventors: Mikio Takeuchi; Tomotaka Kurozu, both of Kanagawa, Japan

[73] Assignee: Nissan Motor Company, Limited, Japan

[21] Appl. No.: 559,951

[22] Filed: Jul. 31, 1990

[30] Foreign Application Priority Data

Jul. 31, 1989 [JP] Japan ................... 1-196880
Aug. 15, 1989 [JP] Japan ................... 1-209552

[51] Int. Cl.⁵ .............................................. E05B 65/12
[52] U.S. Cl. .......................................... 70/186; 70/252
[58] Field of Search ............... 70/252, 184, 185, 186; 307/10 AT

[56] References Cited

U.S. PATENT DOCUMENTS

| | | | |
|---|---|---|---|
| 4,352,278 | 10/1982 | Neyret | 70/252 |
| 4,487,042 | 12/1984 | Mochida | 70/186 |
| 4,719,460 | 1/1988 | Takeuchi et al. | 70/252 |
| 4,794,260 | 12/1988 | Nakano | 307/10 AT |
| 4,938,043 | 7/1990 | Burr | 70/252 |

Primary Examiner—Robert L. Wolfe
Attorney, Agent, or Firm—Lowe, Price, Leblanc & Becker

[57] ABSTRACT

A steering lock system for an automotive vehicle includes a steering lock actuator, a control rod, a solenoid with a corresponding plunger and a portable transmitter which produces a radio signal indicative of a transmitter self-identifying code. When the transmitter self-identifying code matches a preset reference code, the solenoid is energized to move the plunger so as to release an engagement between the plunger and the control rod. Accordingly, the control rod is free to move to a position where no engagement between the control rod and the steering lock actuator is established, to allow the steering lock actuator to shift to a steering wheel unlocking position from a steering wheel locking position.

12 Claims, 6 Drawing Sheets

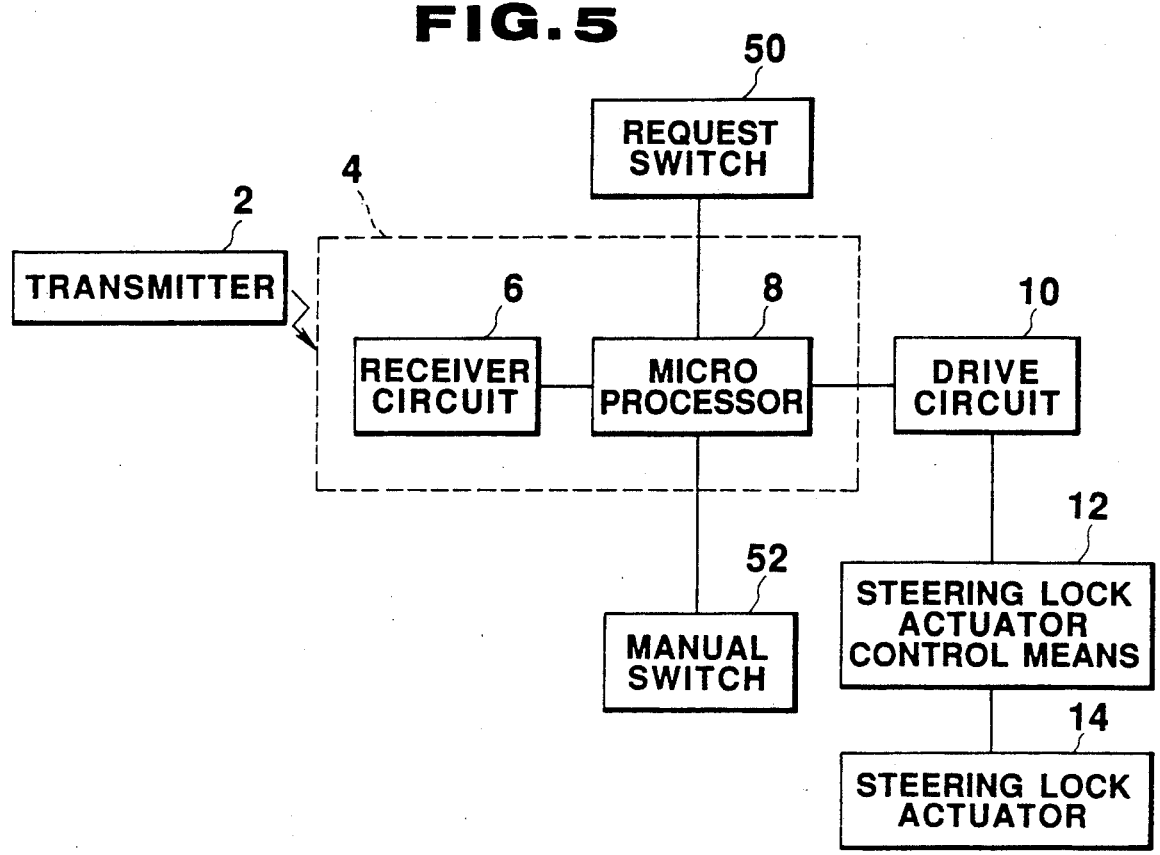
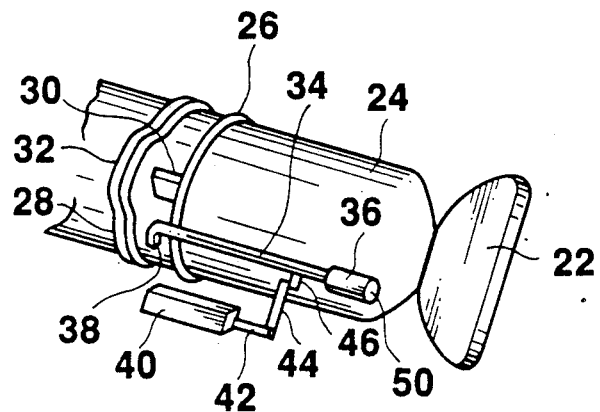

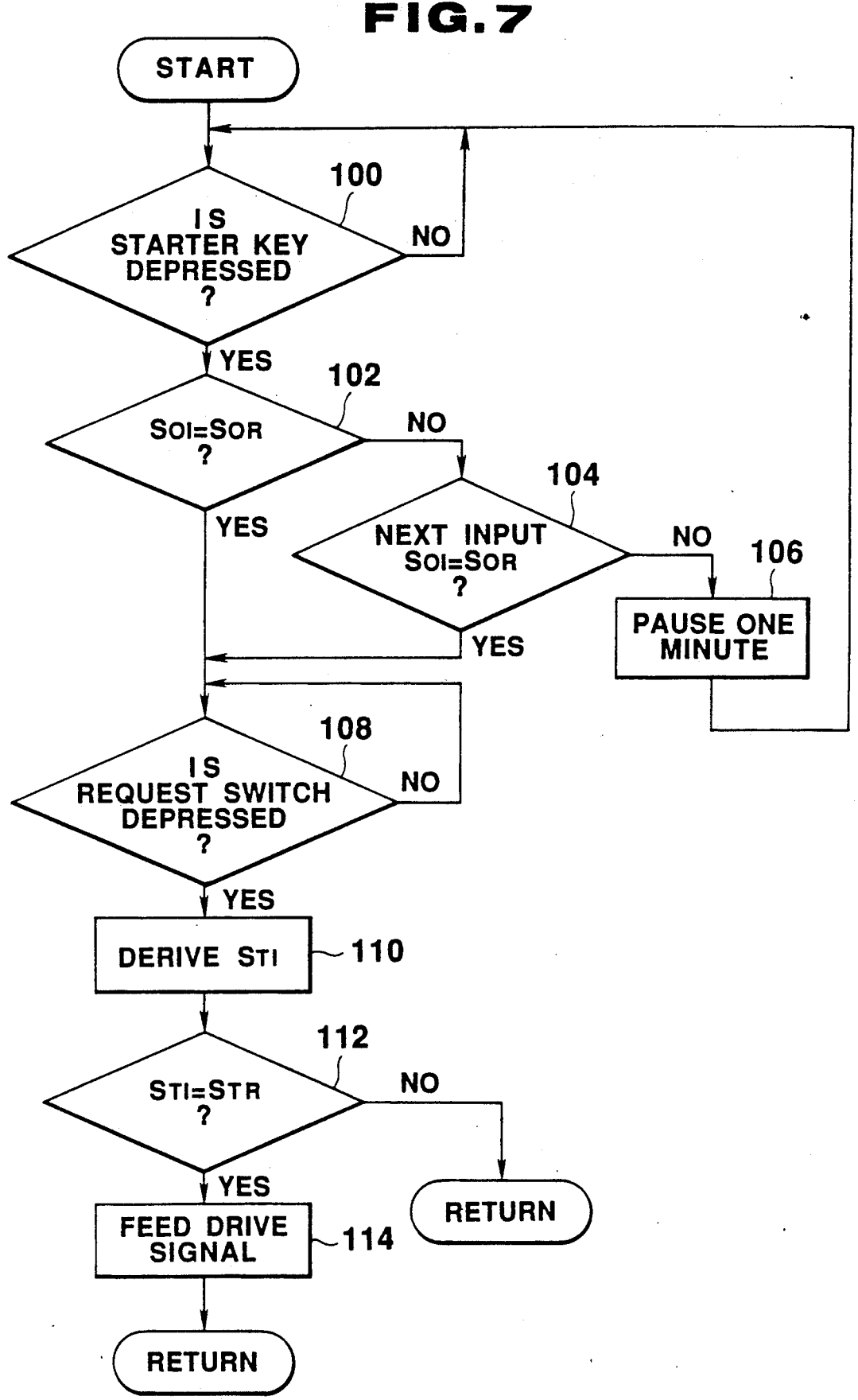

AUTOMOTIVE STEERING LOCK SYSTEM WITH PORTABLE RADIO CODE SIGNAL TRANSMITTER

BACKGROUND OF THE INVENTION

1. Field of the Invention

The present invention relates generally to a steering lock system for an automotive vehicle, and more specifically, to an automotive steering lock system incorporating a portable radio signal transmitter which produces a self-identifying radio code signal, wherein a steering wheel can be unlocked only when the transmitter self-identifying code matches a preset reference code so as to enhance safety against theft or unexpected starting of an automotive engine.

2. Description of the Background Art

Various types of an automotive steering lock system have been proposed for locking and unlocking a steering wheel.

In one type of the steering lock system, a control rod is arranged in parallel to an ignition key cylinder. The control rod is movable between a first position where the ignition key cylinder is prevented from shifting between a steering locking position and a steering unlocking position and a second position where the ignition key cylinder is allowed to shift between the steering locking and unlocking positions.

Specifically, a stopper member is fixed onto an external surface of the ignition key cylinder, and an annular guide member is also fixed on the external surface of the ignition key cylinder. The annular guide member has a recessed portion corresponding to a position of the stopper member. The recessed portion extends axially away from the stopper member. The control rod has an engageable end portion which is engageable with the stopper member to prevent rotation of the ignition key cylinder when the engageable end portion is located out of the recessed portion, while such a engagement is not established when the engageable end portion is located within the recessed portion. The recessed portion is located to allow the engageable end portion to move into the recessed portion by manual operation of the control rod when the ignition key cylinder is in its LOCK and OFF positions, but to prevent the engageable end portion from moving into the recessed portion when the ignition switch is in its positions other than the LOCK and OFF positions, i.e. the engageable end portion is guided by a portion of the annular guide member other than the recessed portion. The steering wheel is locked when the ignition key cylinder is in the LOCK position and unlocked when the ignition key cylinder is in the OFF position and the other positions, such as, ACC, ON and START positions.

When the ignition key cylinder is rotated from the other positions to the OFF position, since the engageable end portion of the control rod has been guided by the portion of the annular guide member other than the recessed portion, the engageable end portion is engageable with the stopper member so that shifting of the ignition key cylinder from the OFF position to the LOCK position is prohibited. Accordingly, by the manual depressing operation of the control rod to move the engageable end portion into the recessed portion, the engagement between the engageable end portion and the stopper member is released to allow the ignition key cylinder to shift to the LOCK position so as to lock the steering wheel. On the other hand, when shifting the ignition key cylinder to the OFF position from the LOCK position, since the engageable end portion of the control rod is located within the recessed portion, the ignition key cylinder is allowed to shift to the OFF position to unlock the steering wheel only by rotating an ignition key.

Accordingly, if the ignition key is left in the vehicle, even a mere child can easily unlock the steering wheel to start the automotive engine. This is undesirable in view of the safety.

SUMMARY OF THE INVENTION

Therefore, it is an object of the present invention to provide a steering lock system for an automotive vehicle that can eliminate the above-noted defects inherent in the background art.

It is another object of the present invention to provide a steering lock system for an automotive vehicle, wherein shifting of a steering lock actuator from its steering locking position to its steering unlocking position requires an operation for unlocking the steering lock actuator.

It is a further object of the present invention to provide a steering lock system for an automotive vehicle, wherein an emergency mechanism is provided for forcibly unlock a steering lock actuator to unlock a steering wheel.

It is a still further object of the present invention to provide a steering lock system for an automotive vehicle, wherein a theft-prevention is highly ensured by employing a preset operator self-identifying code.

To accomplish the above-mentioned and other objects, according to one aspect of the present invention, a steering lock system for an automotive vehicle comprises:

a steering lock actuator movable between a first position where a steering wheel is locked and a second position where the steering wheel is unlocked, the steering lock actuator having a center axis;

rod means provided adjacent to the steering lock actuator and extending along the center axis, the rod means movable along the center axis between a third position where the steering lock actuator is prevented from moving between the first and second positions, and a fourth position where the steering lock actuator is allowed to move between the first and second positions;

electrically operable means having first means, the first means provided adjacent to the rod means and movable along the center axis between a fifth position where the rod means is retained in the third position, and a sixth position where the rod means is movable between the third and fourth positions;

a portable transmitter for outputting a radio signal indicative of a transmitter self-identifying code;

second means for receiving the radio signal from the transmitter, comparing the transmitter self-identifying code with a preset transmitter identifying reference code, and producing a drive signal when the transmitter self-identifying code matches the preset transmitter identifying reference code;

the electrically operable means, responsive to the drive signal, allowing the first means to move to the sixth position so that the rod means is allowed to move to the fourth position for allowing the steering lock actuator to move to the second position from the first position.

According to another aspect of the present invention, the steering lock system may further include third means for manually inputting an operator self-identifying code and fourth means for receiving the operator self-identifying code from the third means and comparing the operator self-identifying code with a preset operator identifying reference code, and wherein the second means compares the transmitter self-identifying code with the preset transmitter identifying reference code when the operator self-identifying code matches the preset operator identifying reference code.

According to a further aspect of the present invention, fifth means may be provided, associated with the first means, for forcibly displace the first means relative to the rod means so as to allow the rod means to move between the third and fourth positions.

BRIEF DESCRIPTION OF THE DRAWINGS

The present invention will be understood more fully from the detailed description given hereinbelow and from the accompanying drawings of the preferred embodiments of the invention, which are given by way of example only, and are not intended to be limitative of the present invention.

In the drawings:

FIG. 5 is a schematic block diagram showing the general construction of a steering lock system for an automotive vehicle according to a second preferred embodiment of the present invention;

FIG. 6 is a perspective view showing a steering lock actuator and steering lock actuator control means to be incorporated in the second preferred embodiment;

FIG. 7 is a flowchart showing a steering wheel unlocking routine to be executed by a control unit, according to the second preferred embodiment;

DESCRIPTION OF THE PREFERRED EMBODIMENT

Figure 1:
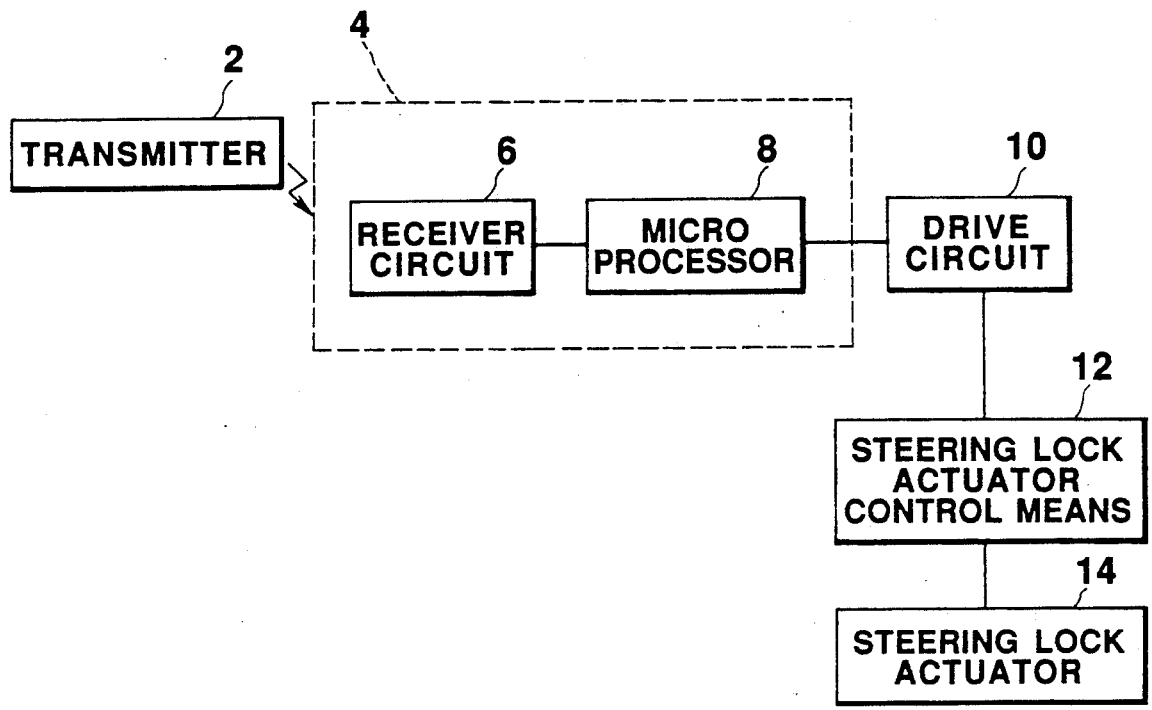
FIG. 1 is a schematic block diagram showing the general construction of a steering lock system for an automotive vehicle according to a first preferred embodiment of the present invention.

Referring now to the drawings, preferred embodiments of a steering lock system for an automotive vehicle according to the present invention will be described with reference to FIGS. 1 to 10(B).

FIG. 1 shows a general construction of the first preferred embodiment of the automotive steering lock system. The first preferred embodiment utilizes a so-called keyless ignition switch for locking and unlocking a steering wheel (not shown). In FIG. 1, a radio signal transmitter 2 is of a size equivalent to a bank-card, credit-card and the like and includes a long-life battery, such as, a lithium battery and the like. The portable transmitter 2 also includes therein a transmitter circuit and a transmitter antenna to transmit a radio signal indicative of a preset transmitter identification code to a control unit 4 through the transmitter antenna.

The control unit 4 includes a receiver circuit 6 including a receiver antenna for receiving the radio signal from the portable transmitter 2 and a microprocessor 8. The microprocessor 8 has a memory storing a preset reference code and compares the radio transmitter identifying code signal with the preset reference code. When both codes are matched, then the control unit 4 outputs a drive signal to a drive circuit 10 for operating a steering lock actuator control means 12 including a solenoid and a corresponding plunger. Specifically, when the steering lock actuator control means 12 is energized by the drive circuit in response to the drive signal, the steering lock actuator control means 12 is operated to unlock the keyless ignition switch serving as a steering lock actuator 14 so that the steering lock actuator 14 becomes manually operable between steering wheel locking and unlocking positions. On the other hand, when no drive signal is applied to the steering lock actuator control means 12, the steering lock actuator 14 is locked to disable a manual operation thereof between the steering wheel locking and unlocking positions.

Detailed structure of the radio signal transmitter 2 and the control unit 4 and triggering of the operations of the radio signal transmitter 2 and the control unit 4, as well as the deriving of the drive signal are disclosed in U.S. Pat. No. 4,719,460 issued on Jan. 12, 1988, the contents of which are incorporated herein by reference for the sake of disclosure. However, modification is made in this preferred embodiment that once the control unit 4 starts to feed the drive signal to the drive circuit 10, the feeding of the drive signal continues as long as the control unit 4 receives the self-identifying radio code signal from the portable transmitter 2 which continues to generate the self-identifying code signal until the portable transmitter 2 gets out of a communication area or range relative to the control unit 4. When the portable transmitter 2 gets out of the above-noted communication area, the portable transmitter 2 stops the feeding of the self-identifying code signal to the control unit 4 to remain in a stand-by state, waiting for a next trigger signal from the control unit 4 to produce the self-identifying code signal as disclosed in the above-noted United States Patent. Similarly, the control unit 4 stops the feeding of the drive signal to the drive circuit 10 to remain in a stand-by state, waiting for a next trigger signal from a manual switch (not shown) to start communication with the portable transmitter 2, which is also disclosed in the above-noted United States Patent.

Figure 2:
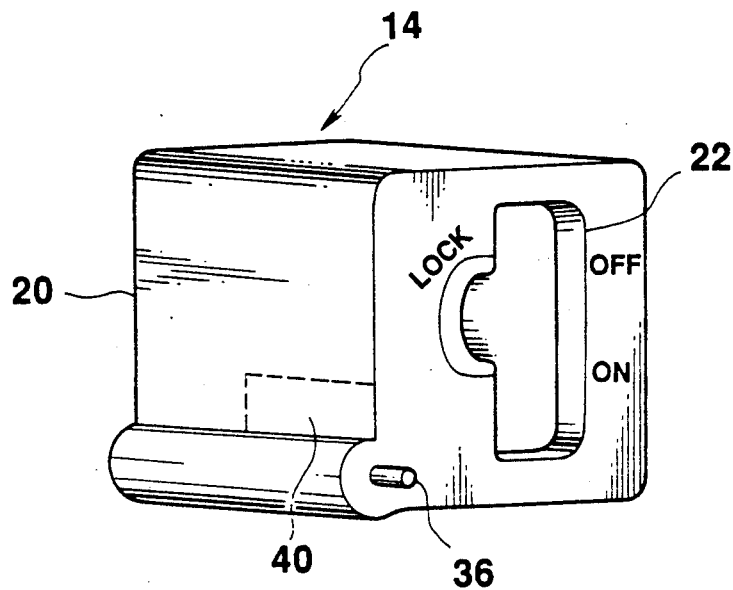
FIG. 2 is a perspective view showing a steering lock actuator and steering lock actuator control means with a casing enclosing them, to be incorporated in the first preferred embodiment.
Figure 3:
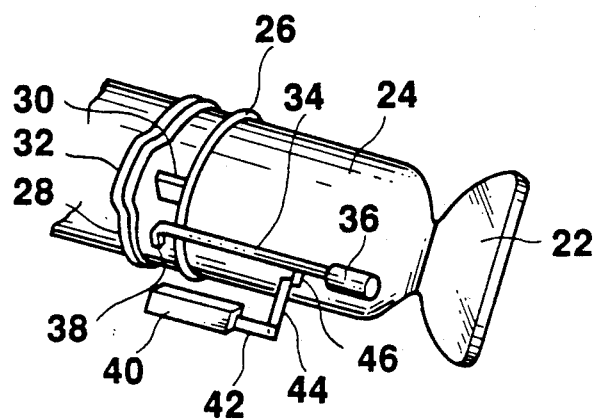
FIG. 3 is a perspective view showing the steering lock actuator and the steering lock actuator control means of FIG. 2 without the casing.

FIG. 2 shows the keyless ignition switch 14 serving as the steering lock actuator, as well as the steering lock actuator control means 12 with a case 20 enclosing them, and FIG. 3 shows the same members without the case 20.

The ignition switch 14 has a LOCK position where a steering shaft is locked through known mechanism to lock a steering wheel, an OFF position where no electric power is fed to automotive electrical accessories, an ACC position where the electric power is fed to the electrical accessories, an ON position where the electric power is fed to an engine ignition system and to the electrical accessories and a START position where the electric power is applied to a starter motor for starting the engine. In the OFF, ACC, ON and START positions, the steering shaft is unlocked.

In FIG. 3, the ignition switch 14 includes an manual operation knob 22 and a key cylinder 24 which is integral with the manual operation knob 22. By manually operating or rotating the manual operation knob 22, the key cylinder 24 rotates between the LOCK position and the START position. An annular ring 26 is fixed on an outer periphery of the key cylinder 24. The annular ring 26 is arranged in a plane perpendicular to a longitudinal center axis of the key cylinder 24. An annular guide ring 28 is fixed on the outer periphery of the key cylinder 24 in parallel to and spacing a given distance from the annular ring 26 in an axial direction away from the manual operation knob 22. A stopper 30 is fixed to the annular ring 26 between the annular rings 26 and 28. The annular guide ring 28 has a recessed portion 32 corresponding to a position where the stopper 30 is located. The recessed portion 32 projects in the axial direction away from the manual operation knob 22.

A control rod 34 is arranged extending along the axis of the key cylinder 24 and is manually movable therealong. The control rod 34 has a manually operable head 36 at its first axial end adjacent to the manual operation knob 22 and a L-shaped portion at its second axial end positioned between the annular rings 26 and 28. The L-shaped end extends toward the outer periphery of the key cylinder 24 to have a tip portion which is engageable with the stopper 30 when the control rod 34 is located in its first position where the control rod 34 is moved maximumly in the axial direction toward its first end. On the other hand, when the control rod 34 is displaced maximumly in the axial direction toward its second end into the recessed portion 32, no engagement is established between the stopper 30 and the L-shaped end 38 of the control rod 34.

A solenoid 40 is arranged near the control rod 34 with a corresponding plunger 42 which extends in parallel to the control rod 34 and is adapted to move along the control rod 34 according to energization of the solenoid 40. Specifically, when the solenoid 40 is energized through the drive circuit 10 in response to the drive signal fed from the control unit 4, the plunger 42 moves into the solenoid 40, i.e. in the axial direction toward the second end of the control rod 34. On the other hand, when the solenoid 40 is de-energized in response to no drive signal from the control unit 4, the plunger 42 gets out of the solenoid 40, i.e. moves in the axial direction toward the first end of the control rod 34.

A pin member 44 is fixed to the plunger 42 and extends in perpendicular to the plunger 42 or the control rod 34. The pin member 44 is engageable with a stopper member 46 which is fixed to the control rod 34 at a position near the manually operable head 36.

Now, the operation of the first preferred embodiment will be described with reference to FIGS. 4(A), (B), (C) and (D).

Figures 4A, 4B, 4C, 4D:
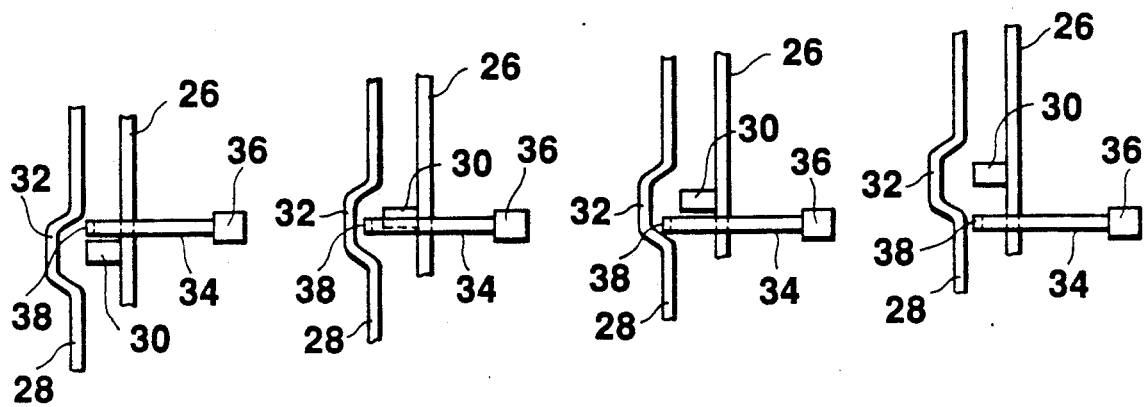
FIGS. 4(A), (B), (C) and (D) are explanatory views respectively showing positional relationship between a control rod and associated members fixed to an ignition cylinder key.

In FIG. 4(A), the ignition switch 14 is in the LOCK position so that the steering wheel is locked. In this condition, since no drive signal is fed to the drive circuit 10 from the control unit 4, the solenoid 40 is de-energized. Accordingly, the plunger 42 is displaced maximumly in the axial direction toward the first end of the control rod 34 to retain the control rod 34 in its first position by the engagement of the pin member 44 and the stopper member 46. Therefore, the L-shaped portion 38 of the control rod 34 is engageable with the stopper 30 fixed to the annular ring 26 to disable the operation knob 22 to be rotated to shift the ignition switch 14 from the LOCK position to the OFF position, i.e. the steering wheel can not be unlocked.

Now, it is assumed that a vehicle driver uses the portable radio signal transmitter 2 to feed the self-identifying code signal to the control unit 4. As described above, the control unit 4 compares the self-identifying code signal with the preset reference code stored in the memory of the control unit 4 to feed the drive signal to the drive circuit 10 when both codes are matched, but to feed no drive signal to the drive circuit 10 when the codes do not match. If the control unit 4 decides that the codes do not match to generate no drive signal, then, since the control rod 34 is retained in its first position by the engagement between the pin member 44 and the stopper member 46, the displacement of the control rod 34 toward its second position where the engagement between the L-shaped portion 38 and the stopper 30 is released, is prohibited, i.e. depression of the manually operable head 36 by the vehicle driver is not allowed. Accordingly, the steering wheel remains locked.

On the other hand, if the control unit 4 decides that both codes are matched to feed the drive signal to the drive circuit 10, then the solenoid 40 is energized to move the plunger 42 in the axial direction toward the second end of the control rod 34. Accordingly, the pin member 44 moves away from the stopper member 46 to allow the control rod 34 to move toward the second position to release the engagement between the L-shaped portion 38 and the stopper 30. Therefore, by operating the manually operable head 36 of the control rod 34 to depress the control rod 34, the manual operation knob 22 is allowed to be rotated to shift the ignition switch 14 from the LOCK position to the OFF position, as shown in FIGS. 4(B) and (C), where the steering wheel is unlocked, and further to the ACC position, the ON position and the START position.

As seen from FIG. 4(D) which shows the ignition switch 14 in its ACC position, after the ignition switch 14 is shifted from the OFF position toward the ACC, ON or START position, the control rod 34 is guided by the annular guide member 28 other than its recessed portion 32 to move back to its first position. Accordingly, when the ignition switch 14 is shifted from the START, ON or ACC position to the OFF position, since the L-shaped portion 38 of the control rod 34 is in the position engageable with the stopper 30 fixed to the annular ring 26, the ignition switch 14 or the key cylinder 24 is prevented from shifting to the LOCK position. In this OFF position, since the recessed portion 32 of the annular guide member 28 is located corresponding to the position of the control rod 34, i.e. its L-shaped portion 38 as seen from FIG. 4 (C), the control rod 34 is allowed to move into its second position by manually depressing the operation head 36 to release the engagement between the L-shaped portion 38 and the stopper 30. Accordingly, by manually operating the operation knob 22, the ignition switch 14 is shifted to the LOCK position.

As described above, since the drive signal is fed to the drive circuit 10 to energize the solenoid 40 while the portable radio signal transmitter 2 is within the communication area or range relative to the control unit 4, the control rod 34 remains at its second position where the engagement between the L-shaped portion 38 and the stopper 30 is not established. On the other hand, when the vehicle driver rides off the vehicle with the portable radio signal transmitter 2 to place the portable transmitter 2 out of the communication area relative to the control unit 4, no drive signal is fed to the drive circuit 10 to de-energize the solenoid 40. Accordingly, the control rod 34 is moved to its first position, being forced by the movement of the pin member 44, i.e. by the engagement between the pin member 44 and the stopper member 46 to allow the L-shaped portion 38 to be engageable with the stopper 30 fixed to the annular ring 26, which just corresponds to the condition as shown in FIG. 4 (A). Accordingly, to unlock the steering wheel, the operation as described with reference to FIG. 4 (A) is necessary.

It is to be appreciated that the feeding of the self-identifying radio code signal from the portable transmitter 2 and the feeding of the drive signal to the drive ciruit 10 are not limited to the manner as described above, but may be controlled in other proper ways which are obvious for those skilled in the art.

Now, the second preferred embodiment of the automotive steering lock system according to the present invention will be described hereinbelow. All through the second preferred embodiment, the same or like members or components are designated by the same reference numerals to omit explanation thereof for avoiding redundant disclosure.

FIG. 5 shows a general construction of the second preferred embodiment of the automotive steering lock system. In the second preferred embodiment, the detailed structures of the portable radio signal transmitter 2 and the control unit 4 are the same as those in the first preferred embodiment. The portable radio signal transmitter 2 is normally in the stand-by state, waiting for a trigger signal from the control unit 4 to produce the transmitter self-identifying code signal as in the first preferred embodiment. Similarly, the control unit 4 is normally in the stand-by state, waiting for a trigger signal from a manual switch 52 to perform execution of a steering wheel unlocking routine as shown in FIG. 7. Further, the feeding of the self-identifying radio code signal from the portable transmitter 2 and the feeding of the drive signal from the control unit 4 are the same as those in the first preferred embodiment, i.e. once the control unit 4 starts to feed the drive signal to the drive circuit 10, the feeding of the drive signal continues as long as the control unit 4 receives the self-identifying radio code signal from the portable transmitter 2 which continues to generate the self-identifying code signal until the portable transmitter 2 gets out of the communication area or range relative to the control unit 4. When the portable transmitter 2 gets out of the above-noted communication area, the portable transmitter 2 stops the feeding of the self-identifying code signal to the control unit 4 to remain in the stand-by state, waiting for a next trigger signal from the control unit 4 for producing the self-identifying code signal. Similarly, when the portable transmitter 2 gets out of the above-noted communication area, the control unit 4 stops the feeding of the drive signal to the drive circuit 10 to remain in the stand-by state, waiting for a next trigger signal from the manual switch 52 to perform execution of the steering wheel unlocking routine of FIG. 7.

Figure 8:
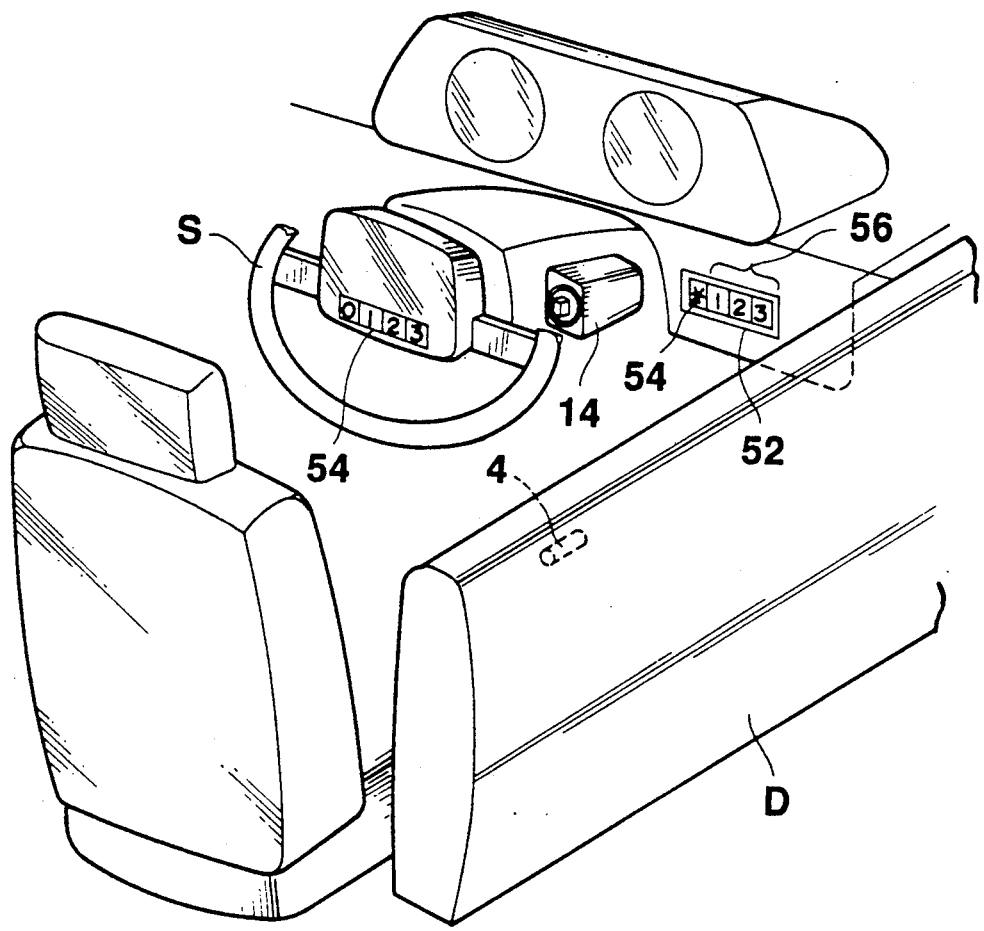
FIG. 8 is a perspective view showing positional arrangements of associated members.

In the second preferred embodiment, a request switch 50 in the form of, for example, an optical sensor is provided at the manually operable head 36 of the control rod 34, as shown in FIG. 6. The request switch 50 turns ON when the vehicle driver touches the manually operable head 36 with one's finger, which ON signal is fed to the microprocessor 8. As shown in FIG. 8, the manual switch 52 is arranged on a vehicle instrument panel near the driver for manually inputting a preset operator self-identifying code which is fed to the microprocessor 8. The microprocessor 8 compares the operator self-identifying code fed from the manual switch 52 with a stored operator identifying reference code. When the microprocessor 8 decides that both codes are matched and receives the request switch ON signal, the microprocessor 8 reads out the transmitter self-identifying radio signal fed from the portable transmitter 2 and compares it with the preset transmitter identifying reference code to produce the drive signal which is fed to the drive circuit 10 for energizing the solenoid 40.

The operation of the solenoid 40 by the drive signal and the corresponding operations of the control rod 34 and the ignition switch 14 for locking and unlocking the steering wheel are the same as those in the first preferred embodiment.

As shown in FIG. 8, the control unit 4 is arranged inside of a vehicular front door D and the ignition switch 14 along with the control rod 34 and the solenoid 40 is provided near a steering column, and the manual switch 52 is provided on the instrument panel near the driver. The manual switch 52 includes several manually operable keys including a starter key 54 and three keys 56 for manually inputting the operator self-identifying code as described above.

Now, the detailed operation of the second preferred embodiment will be described with reference to FIG. 7 which shows a flowchart of the steering wheel unlocking routine to be executed by the microprocessor 8. This routine is executed when the ignition switch 14 and the associated members are in the condition as shown in FIG. 4 (A).

At a first step 100, it is decided whether the starter key 54 is depressed. If a decision at the step 100 is NO, then the routine goes back to repeat the step 100 until the starter key 54 is depressed. In other words, the microprocessor 8 normally remains in the stand-by state, waiting for the depression of the starter key 54 to execute the steering wheel unlocking routine. On the other hand, if the decision at the step 100 is YES, then the routine proceeds to a step 102 where the operator self-identifying code $S_{OI}$ manually input from the manual switch 52 is compared with the preset operator identifying reference code $S_{OR}$. If a decision at the step 102 is NO, i.e. the operator self-identifying code $S_{OI}$ does not match the operator identifying reference code $S_{OR}$, then the routine goes to a step 104 where a next input of the operator self-identifying code $S_{OI}$ from the manual switch 52 is compared with the operator identifying reference code $S_{OR}$. If a decision at the step 104 is NO, then the routine goes to a step 106 where the routine pauses for a given time, such as, one minute, and then returns to the step 100.

On the other hand, if the decision at the step 102 or at the step 104 is YES, i.e. the operator self-identifying code $S_{OI}$ matches the preset operator identifying reference code $S_{OR}$, then the routine proceeds to a step 108 where it is decided whether the request switch 50 is depressed. If a decision at the step 108 is NO, then the step 108 is repeated until the request switch 50 is depressed. If the decision at the step 108 is YES, then the routine proceeds to a subsequent step 110 where the trigger signal is fed to the portable transmitter 2 to derive the transmitter self-identifying code signal $S_{TI}$. The trigger signal from the control unit 4 may be fed to the portable transmitter 2 at another proper timing.

Subsequently, the routine goes to a step 112 where the transmitter self-identifying code signal $S_{TI}$ is compared with the preset transmitter identifying reference code $S_{TR}$. If a decision at the step 112 is NO, i.e. the transmitter self-identifying code signal $S_{TI}$ does not match the transmitter identifying reference code $S_{TR}$, then the routine goes to RETURN. On the other hand, if the decision at the step 112 is YES, then the routine goes to a subsequent step 114 where the drive signal is fed to the drive circuit 10 to energize the solenoid 40. Accordingly, the control rod 34 gets unlocked to allow the driver to manually depress it so as to release the engagement between the L-shaped portion 38 of the control rod 34 and the stopper 30 fixed to the annular ring 26. By operating the manually operable knob 22, the steering wheel can be unlocked as shown in FIGS. 4 (B) and (C).

As appreciated from the foregoing description, in the second preferred embodiment, since the matching between the operator self-identifying code $S_{OI}$ and the preset operator identifying reference code $S_{OR}$ is required for unlocking the steering wheel, in addition to the matching between the transmitter self-identifying code $S_{TI}$ and the preset transmitter identifying reference code $S_{TR}$, even if the portable transmitter 2 is stolen or left in the vehicle, the unexpected unlocking of the steering wheel and the unexpected starting of the automotive engine is effectively prevented.

It is to be appreciated that, in place of the manual switch 52, a manual switch 54 for a car telephone may be used for inputting the operator self-identifying code. In this case, the manual switch 54 may function as the manual switch 52 only when the ignition switch 14 is in the LOCK position, or in the LOCK position and the OFF position, or an accelerator pedal is in its OFF position. By using the car telephone manual switch 54 as the manual switch 52, it is possible to effectively prevent a third person from noticing the existence of the operator self-identifying code. Accordingly, the safety against the unexpected starting of the engine, such as, the theft-prevention is highly ensured.

Figure 9:
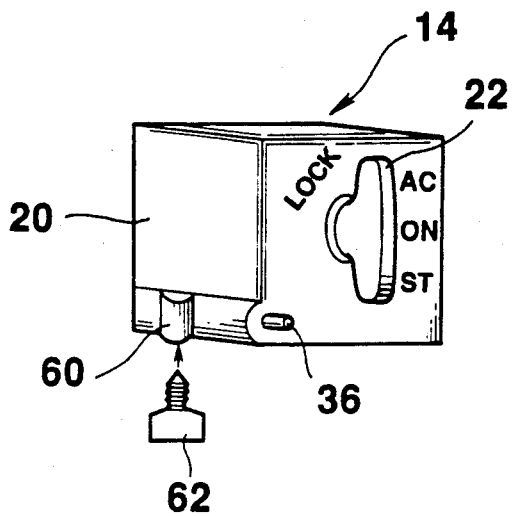
FIG. 9 is a perspective view showing a casing which encloses a steering lock actuator, steering lock actuator control means and an emergency mechanism, according to a modification of the first and second preferred embodiments.
Figure 10:
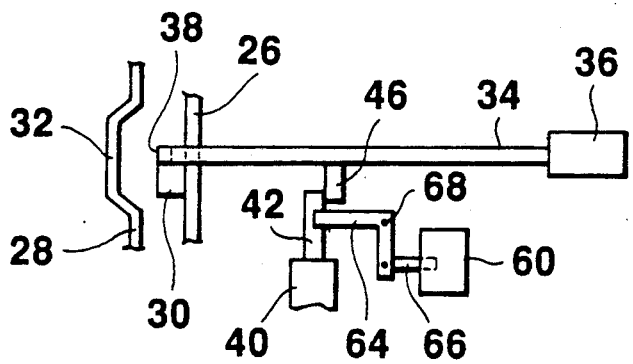
FIGS. 10(A) and (B) are explanatory views respectively showing positional relationship between the emergency mechanism and the associated members.
Figure 10:
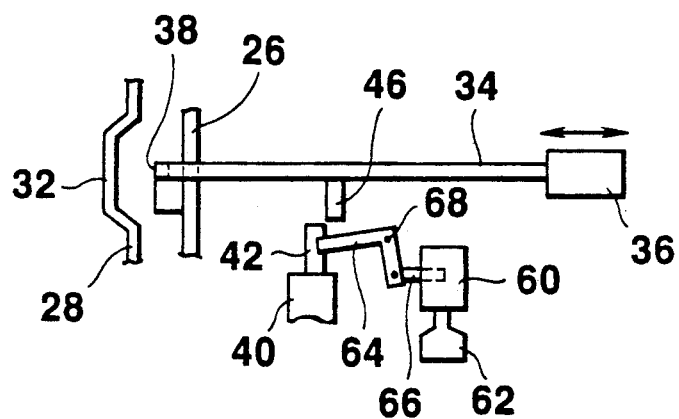

FIGS. 9, 10 (A) and 10 (B) show a modification of the first and second preferred embodiments. In the modification, a fail-safe or emergency mechanism is incorporated which is manually operable when, for example, the portable transmitter 2 is lost or the solenoid 40 does not work properly due to failure in the solenoid 40 itself, failure in the drive circuit 10, failure in the control unit 4 or failure in the portable transmitter 2. All through the description of the modification, the same or like members or components are designated by the same reference numerals to omit explanation thereof for avoiding redundant disclosure.

FIG. 9 shows the case 20 enclosing therein the ignition switch 14, the control rod 34, the solenoid 40 and its drive circuit, and the fail-safe mechanism. The case 20 is additionally formed with an emergency section 60 which has a key hole for insertion of an emergency key 62 to forcibly unlock the control rod 34.

FIG. 10 (A) shows the condition which corresponds to FIG. 4 (A). An L-shaped lever 64 is fixed at its one end to the plunger 42 and at its other end to one end of a connection rod 66. The L-shaped lever 64 is pivotable about a pivot pin 68. The connection rod 66 extends into the emergency section 60 at its other end to engage with a gear train arranged in the emergency section 60. The gear train is actuated by rotating the inserted emergency key 62 to displace the connection rod 66 into the emergency section 60. Any known gear train may be employed as long as it can displace the connection rod 66 into the emergency section 60 by rotating the inserted emergency key 62. At each of the joining portions between the plunger 42 and the L-shaped lever 64 and between the L-shaped lever 64 and the connection rod 66, an elongate hole is formed for providing some play between them.

When the emergency key 62 is inserted into the emergency section 60 through the key hole to be rotated, the connection rod 66 is pulled into the emergency section 60 through the operation of the gear train to allow the L-shaped lever 64 to rotate about the pivot pin 68 in the counterclockwise direction in FIG. 10 (A). Accordingly, the plunger 42 is forcibly pushed into the solenoid 40 to release the engagement between the plunger 42 and the stopper member 46 of the control rod 34, resulting in that the control rod 34 becomes manually operable, as shown in FIG. 10 (B). When the control rod 34 is depressed into the recessed portion 32, the engagement between the L-shaped portion 38 of the control rod 34 and the stopper 30 is released. By operating the manual operation knob 22 to shift the ignition switch 14 from the LOCK position to the OFF position as shown in FIGS. 4 (B) and (C), the steering wheel can be unlocked.

In the above described modification, since the plunger 42 is forcibly movable by the manual operation of the emergency key 62, even when the portable transmitter 2 is lost or some failure occurs in the operation of the solenoid 40, the steering wheel can be unlocked to start the automotive engine.

It is to be appreciated that though the plunger 42 and the solenoid 40 respectively are arranged in perpendicular to the control rod 34, it is preferable to arrange them in parallel to the control rod 34 as in FIGS. 3 and 6, and to arrange the emergency mechanism in a correspondingly displaced angular position.

It is to be understood that this invention is not to be limited to the preferred embodiments described above, and that various changes and modifications may be made without departing from the spirit and scope of the invention as defined in the appended claims.

For example, though the keyless ignition switch is referred to all through the description of the preferred embodiments, the present invention is also applicable to a key-type ignition switch.

What is claimed is:

1. A steering lock system for an automotive vehicle, comprising:
    a steering lock actuator movable between a first position where a steering wheel is locked and a second position where the steering wheel is unlocked, said steering lock actuator having a center axis;
    rod means provided adjacent to said steering lock actuator and extending along said center axis, said rod means movable along said center axis between a third position where said steering lock actuator is prevented from moving between said first and second positions, and a fourth position where said steering lock actuator is allowed to move between said first and second positions;

electrically operable means having first means, said first means provided adjacent to said rod means and movable along said center axis between a fifth position where said rod means is retained in said third position, and a sixth position where said rod means is movable between said third and fourth positions;

a portable transmitter for outputting a radio signal indicative of a transmitter self-identifying code;

second means for receiving said radio signal from said transmitter, comparing said transmitter self-identifying code with a preset transmitter identifying reference code, and producing a drive signal when said transmitter self-identifying code matches said preset transmitter identifying reference code;

said electrically operable means, responsive to said drive signal, allowing said first means to move to said sixth position so that said rod means is allowed to move to said fourth position for allowing said steering lock actuator to move to said second position from said first position.

2. The steering lock system as set forth in claim 1, wherein said first means is retained in said sixth position while said drive signal is fed to said electrically operable means from said second means.

3. The steering lock system as set forth in claim 2, wherein said first means is moved to said fifth position to retain said rod means in said third position when the feeding of said drive signal to said electrically operable means is stopped, said first means being retained in said fifth position while no drive signal is fed to said electrically operable means.

4. The steering lock system as set forth in claim 3, wherein the feeding of said drive signal to said electrically operable means is stopped when the feeding of said radio signal to said second means is stopped.

5. The steering lock system as set forth in claim 1, wherein said electrically operable means includes a solenoid and a drive circuit, said drive circuit, responsive to said drive signal, energizing said solenoid to move said first means to said sixth position.

6. The steering lock system as set forth in claim 5, wherein said first means includes a solenoid plunger extending and movable along said center axis and a connector pin fixed to said solenoid plunger and extending in perpendicular to said center axis, said connector pin engageable with a corresponding projection of said rod means to retain said rod means in said third position when no drive signal is fed to said drive circuit.

7. The steering lock system as set forth in claim 6, further comprising third means, associated with said solenoid plunger, for forcibly displacing said solenoid plunger to release the engagement between said connector pin and said corresponding projection of said rod means.

8. The steering lock system as set forth in claim 7, wherein said third means is actuated by means of manual operation of a key.

9. The steering lock system as set forth in claim 8, wherein said third means includes an L-shaped lever having a first section and a second section joining to said first section in perpendicular thereto, said first section fixed to said solenoid plunger at its one end away from the joining point with the second section, said second section connected to said key through a gear train, said L-shaped lever adapted to pivot about said joining point through said gear train to forcibly displace said solenoid plunger when said key is manually operated.

10. The steering lock system as set forth in claim 1, further comprising fourth means for manually inputting an operator self-identifying code and fifth means for receiving said operator self-identifying code from said fourth means and comparing said operator self-identifying code with a preset operator identifying reference code, and wherein said second means compares said transmitter self-identifying code with said preset transmitter identifying reference code when said operator self-identifying code matches said preset operator identifying reference code.

11. The steering lock system as set forth in claim 10, further comprising sixth means for comparing a subsequent input of said operator self-identifying code with said preset operator identifying reference code, wherein said fifth means decides that said operator self-identifying code is inconsistent with said preset operator identifying reference code, and wherein said second means compares said transmitter self-identifying code with said preset transmitter identifying reference code when said sixth means decides that said operator self-identifying code matches said preset operator identifying reference code.

12. The steering lock system as set forth in claim 1, further comprising seventh means, associated with said first means, for forcibly displacing said first means relative to said rod means to allow said first means to move between said third and fourth positions.

* * * * *